M. R. DE FRANCE.
BRAKE SHOE.
APPLICATION FILED JUNE 22, 1918.
1,303,173.
Patented May 6, 1919.
2 SHEETS—SHEET 1.
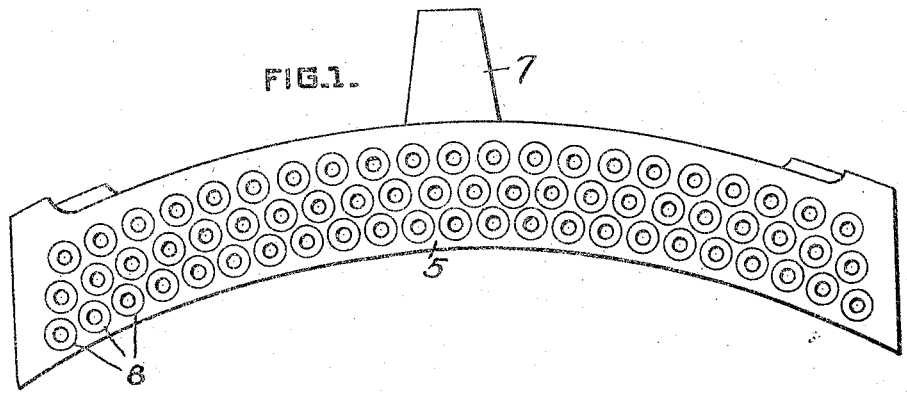
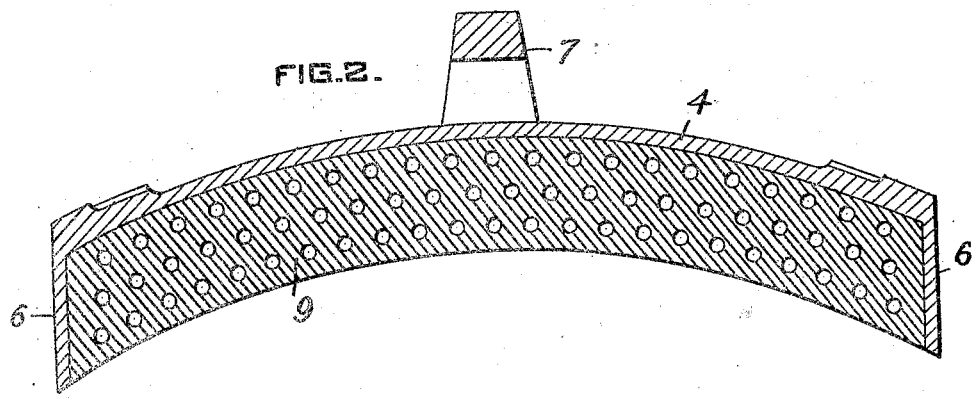
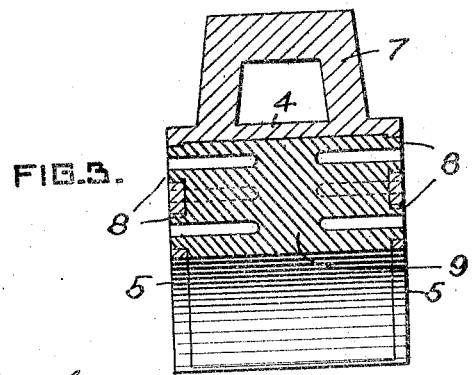
WITNESSES
INVENTOR

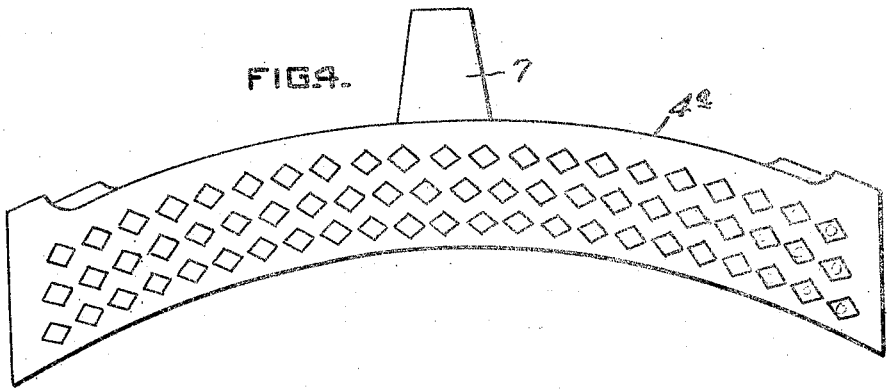
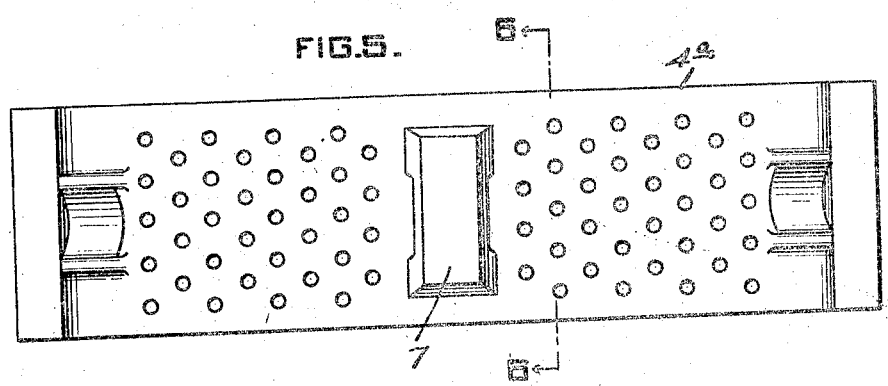
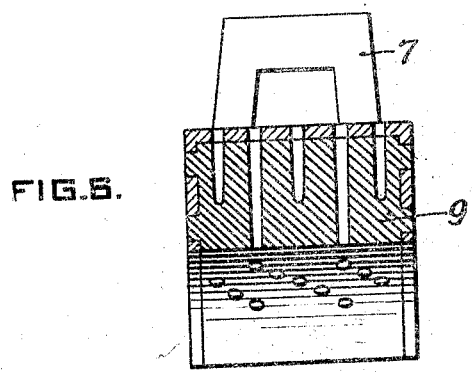

UNITED STATES PATENT OFFICE.

MURRELL R. DE FRANCE, OF BELLEVUE, PENNSYLVANIA.

BRAKE-SHOE.

1,303,173.   Specification of Letters Patent.   Patented May 6, 1919.

Application filed June 22, 1918. Serial No. 241,415.

*To all whom it may concern:*

Be it known that I, MURRELL R. DE FRANCE, a citizen of the United States, and a resident of Bellevue, in the county of Allegheny and State of Pennsylvania, have made a new and useful Invention in Brake-Shoes, of which the following is a specification.

This invention relates to brake shoes.

It is now customary to manufacture brake shoes having an inclosing casing either formed of cast metal or stamped from sheet metal and having a filling formed of frictional material pressed into the casing.

Frictional materials for brake shoes are familiar to those skilled in the art and generally consist of a number of frictional materials such as iron borings and finely divided asbestos held together by means of a binder such as resins or resins and drying oils. It is believed that the outer or frictional surface of these composition brake shoes have a much greater resistance to wear than the inner portions thereof. It is my belief that the exposure of the outer surface to the action of the air in some manner seasons or ages the composition thereby giving to it its wear resisting qualities.

One object of this invention is to provide means whereby the entire mass of the frictional filler may be uniformly aged or cured so as to be uniformly wear resisting throughout.

A further object is to provide in a brake shoe having a composition frictional filler, longitudinal side walls, which as they wear down, will present a minimum amount of metal in contact with wheels against which they bear when applied.

A still further object is to provide in a filled brake shoe, a housing or casing having reticulated longitudinal side walls providing a maximum strength for a minimum weight.

These and other objects I attain by means of the brake shoe illustrated in the single sheet of drawings accompanying and forming a part of this application and throughout the several figures of which like elements are denoted by like characters.

In the drawings Figure 1 is a view in side elevation of a brake shoe embodying this invention, Fig. 2 is a longitudinal central section of the same, Fig. 3 is a cross sectional view of said shoe taken on the center line thereto, Fig. 4 is a view in side elevation of a casing in which the side walls are provided with diamond shaped holes punched therein or expanded in a manner similar to expanded metal as is now well known, Fig. 5 is a top plan view of a modified form of my invention and Fig. 6 is a cross sectional view of said form.

In carrying out one form of this invention I utilize a casing either made as a casting or pressed up from sheet metal and having a back 4, longitudinal sides 5 and ends 6. The casing at its center is provided with customary securing means 7.

The ends and back of the casing as illustrated in Figs. 1, 2 and 3 are plain while the longitudinal sides are reticulated or in other words provided with a large number of holes or openings as shown at 8. If the casing is cast these may be formed in the casting or if the casing is pressed these may be punched or otherwise formed in the longitudinal sides. The holes preferably cover about ⅜ of the side area.

The casing is filled with suitable frictional material 9 having finely divided material and drying oils preferably as above set forth and pressed thereinto. After the filling has been pressed into the casing so that it protrudes through the perforations in the longitudinal sides, holes are formed in the material extending inwardly from each longitudinal side and corresponding in number with the perforations and if this form is adopted these holes will preferably be arranged concentrically with the holes in the side walls, and, while they may extend entirely through the filling material it is preferable to have them extend only about ⅓ of the way across the shoe from side to side as shown in Fig. 3. If it is found desirable the holes on opposite sides of the casing may be staggered but it is believed that it is preferable to have them in line as shown in Fig. 3.

After the holes have been formed in the filler material, that portion of the material which extends beyond the outer face of each side wall of the casing, that which has been pressed out through the side wall openings, is scraped off so as to leave the material flush with the outer surfaces.

In one embodiment of my invention the brake 4ª is reticulated or perforated as shown in my copending application Serial No. 211,277, filed by me on January 10, 1918, and registering with these holes or perforations channels projecting into the filling material are formed as shown in said prior application. When the channels extend into the filling from front to back as shown in Fig. 6 the reticulated side walls as shown in Figs. 1 or 4 are also utilized for the purpose of exposing the filling material to the air and also for the purpose of offering minimum amount of metal to the wheels as the brake shoes wear down.

It will be seen that from both of these constructions the filling material is provided with air holes so that air may come in contact with the interior thereof and aid in aging and seasoning or setting up the friction material as well as ventilating the same for the purpose of carrying away the heat or at least a portion thereof generated during the application of the brake shoes.

Having thus described my invention what I claim is—

1. In a brake shoe, an inclosing metal case having perforated longitudinal side walls and a filling of frictional material containing drying oils having channels extending thereinto from opposite sides and registering with the side wall perforations.

2. In a brake shoe, an inclosing metal case having its longitudinal side walls provided with closely arranged perforations extending throughout the area of said walls and a frictional filler containing material adapted to be aged by exposure to the air and having air channels extending thereinto through said perforations.

3. In a brake shoe, an inclosing metal case the longitudinal side walls of which are perforated throughout their entire area with closely arranged holes and a filling of frictional material extending through said holes and to the outer surface of said side walls containing binding material which ages upon exposure to the air and air channels of smaller bore than said holes and arranged to open into said perforations.

4. In a brake shoe, an inclosing metal case having its longitudinal side walls perforated and a filling of frictional material within said case and containing binding material adapted to be aged upon exposure to the air.

5. In a brake shoe, an inclosing metal case having its longitudinal side walls perforated and a filling of composite frictional material in said case and extending through the side walls perforations to the outer plane of said side walls.

In testimony whereof, I have hereunto subscribed my name this 14th day of June, 1918.

MURRELL R. DE FRANCE.